United States Patent [19]
Granzow et al.

[11] Patent Number: 5,059,750
[45] Date of Patent: Oct. 22, 1991

[54] MULTI-POSITION SWITCH OPERATING MECHANISM FOR ADJUSTMENT OF A VEHICLE SEAT

[75] Inventors: Manfred Granzow, Dörentrup; Hans-Peter Mischer, Horn-Bad Meinberg; Christian Süss, Bad Salzuflen, all of Fed. Rep. of Germany

[73] Assignee: Gebr. Isringhausen, Lemgo, Fed. Rep. of Germany

[21] Appl. No.: 460,950

[22] PCT Filed: Jun. 22, 1989

[86] PCT No.: PCT/EP89/00703

§ 371 Date: Feb. 27, 1990

§ 102(e) Date: Feb. 27, 1990

[87] PCT Pub. No.: WO90/00123

PCT Pub. Date: Jan. 11, 1990

[30] Foreign Application Priority Data

Jun. 29, 1988 [DE] Fed. Rep. of Germany ....... 3821952

[51] Int. Cl.$^5$ ............................................. H01H 9/00
[52] U.S. Cl. ............................................. 200/5 R
[58] Field of Search ............ 200/5 R, 6 A, 6 R, 17 R, 200/18, 6 B, 6 BA, 6 BB, 6 C

[56] References Cited

U.S. PATENT DOCUMENTS

| | | | |
|---|---|---|---|
| 2,756,290 | 7/1956 | Lybrook | 200/6 A |
| 2,823,272 | 2/1958 | Adams | 200/6 A |
| 3,135,839 | 6/1964 | Colautti et al. | 200/5 R |
| 3,156,134 | 11/1964 | Forrester, Jr. | 200/6 A X |
| 3,293,381 | 12/1966 | Eitel | 200/6 A |
| 3,483,337 | 12/1969 | Johnstone et al. | 200/6 A |
| 4,761,522 | 8/1988 | Allen | 200/5 R |

FOREIGN PATENT DOCUMENTS 2836004 3/1980 Fed. Rep. of Germany .
3639827 6/1988 Fed. Rep. of Germany .

Primary Examiner—J. R. Scott
Attorney, Agent, or Firm—Salter & Michaelson

[57] ABSTRACT

An actuating device for controlling the operation of a vehicle seat includes a central block movable about a central block shaft in four different directions to execute four distinct adjustment functions. A handle housing is mounted on a shaft perpendicular to the central block shaft. The handle housing is rotatable in fifth and sixth directions to execute distinct fifth and sixth adjustment functions.

1 Claim, 1 Drawing Sheet

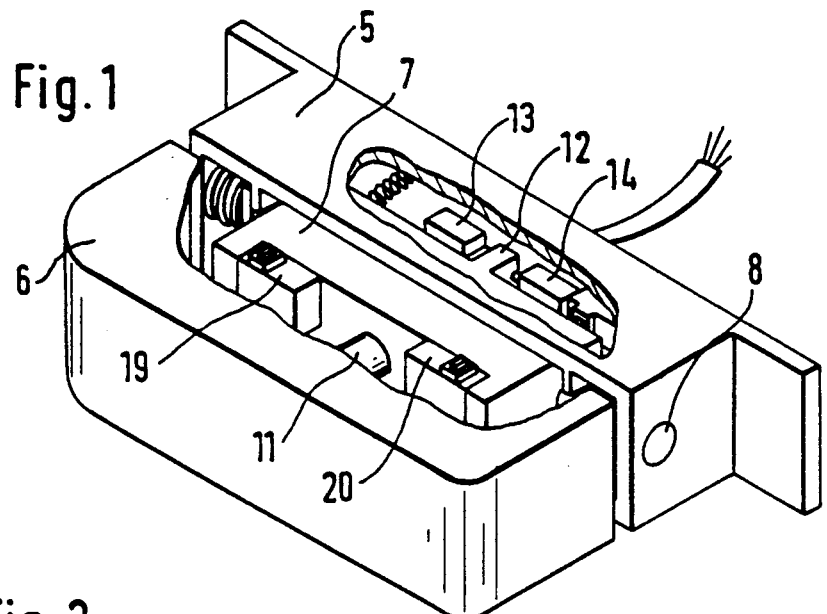
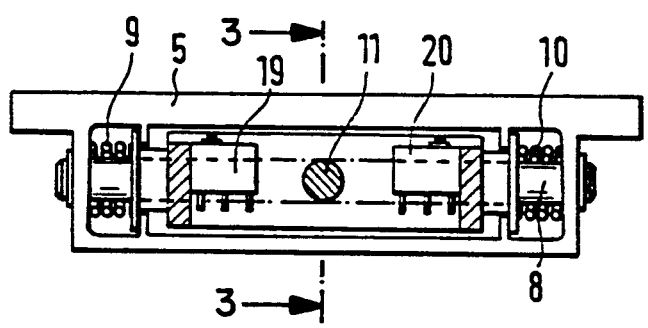
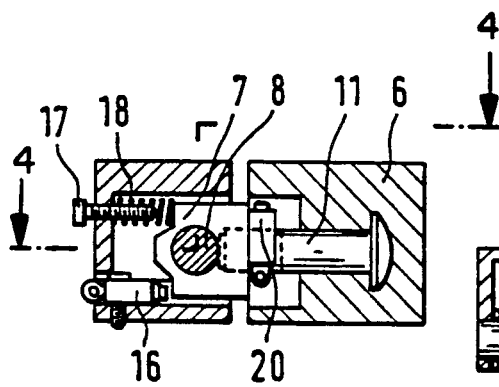
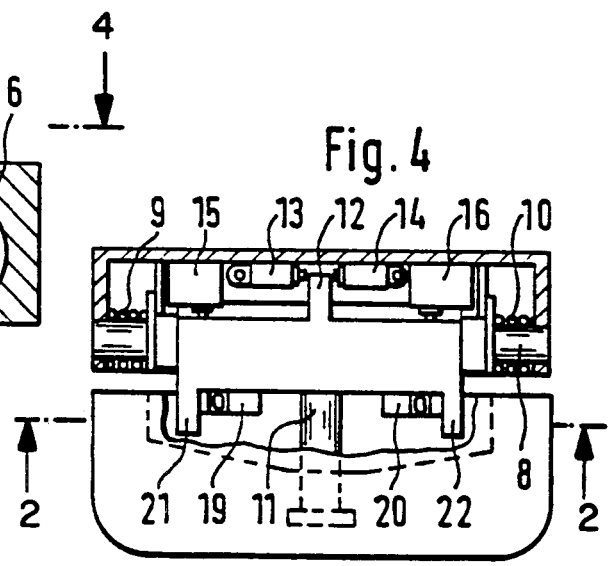

MULTI-POSITION SWITCH OPERATING MECHANISM FOR ADJUSTMENT OF A VEHICLE SEAT

BACKGROUND AND SUMMARY OF THE INVENTION

This invention relates to an operating mechanism for an automobile seat with several electrically and/or pneumatically operated adjusting units.

An operating mechanism of this type is disclosed by German Patent 35 17 346. It is used to operate a total of 3 adjusting units including for the tilt adjustment of the backrest, for the height adjustment of the seat, and for horizontal shifting of the seat. However a total of 3 operating parts combined as a unit are necessary for this, each of which requires a distinct control in each case before its actuation, for example by testing its spatial position and/or its variable surface structure so that the proper operating part for the desired adjusting unit is recognized, engaged, and operated. This is disadvantageous.

It is also a drawback that the 3 operating parts of the known operating mechanism can be operated only by traction in one direction, so that only one function can be triggered by this for the particular associated adjusting unit, for example, unlocking a mechanism locked in the quiescent state, or opening a pneumatic valve that is closed in the rest state. This is inadequate for many applications such as for automobile seat operating mechanisms, since the modern luxury seats of today that are adjusted by electric motor or pneumatically require two functions for each possible adjustment. For example, in the case of a height adjustment by electric motor, the seat has to be adjustable optionally upward from the bottom and in the reverse direction downward from the top, i.e., the operating mechanism alone must be able to trigger two functions for the height adjustment of the seat by electric motor.

It is the purpose of this invention to provide an operating mechanism for automobile seats that is constructed with only one operating part as a so-called single-handle operating mechanism in order to avoid the inconvenient recognition and selection of a single operating part out of several, and that can nevertheless trigger a total of at least 6 functions in logical correlation with the adjusting units of an automobile seat.

This problem is solved pursuant to the invention by the fact that the operating mechanism has a central block that extends partly, i.e., by a first component, into a fastening case, and with another section, i.e., with a second component, into a handle housing, with the central block being mounted on a central block shaft that is located in the fastening case and can move on the central block in the axial direction relative to the fastening case, and can pivot around the central block shaft. The handle housing is mounted on and can pivot around a handle housing shaft that is fastened to the central block shaft perpendicular to the central block. An electric or pneumatic operating element is associated with each of the relative motions that the handle housing can execute relative to the central block and/or the central block can execute relative to the fastening case, the operating elements either being fastened to the central block, the handle housing or the fastening case housing.

A particularly beneficial embodiment of the invention provides that the central block is essentially completely enclosed by the fastening case on the one hand and by the handle housing on the other, so that the central block and the operating elements are located inside the housing enclosure protected against damage and contamination, and the operating mechanism as a whole can be given an essentially closed external esthetic form.

The central block is an essential part of the new operating mechanism. It carries the handle housing shaft and thus the only operating handle of the mechanism. It is possible with no problems by means of the single handle to move and pivot the central block on its central block shaft inside the fastening case, by which motions of the central block can be executed optionally in a total of 4 directions relative to the fastening case, which are sensed by electric or pneumatic operating elements positioned in or on the particular path of motion and converting the particular relative motion executed into a logic function.

Independently of the motions of the central block relative to the fastening case, the single handle can be pivoted around its handle housing shaft relative to the central block. This produces two further logic functions, depending on whether the single handle is pivoted in one direction or the other.

A refinement of the operating mechanism described above is provided by the single handle optionally being movable with its handle housing shaft relative to the central block in the direction of the handle housing shaft. This permits two further logic functions that can be utilized, for example, for adjusting units to be operated less frequently.

In all of the structural embodiments of the invention, the electric and/or pneumatic operating elements which sense the particular motion of the handle housing relative to the central block and/or of the central block relative to the fastening case can be fastened either to the central block or to the particular housing of the fastening case or the handle.

If the operating mechanism is equipped with pneumatic operating elements in the form of on/off valves, then a particularly desirable embodiment of the invention provides that all of the operating elements are integrated into the central block, by drilling it as a multiple valve body, for example, with internal compressed air branches so that the valve body or the central block needs only a supply line for compressed air, and the compressed air passages to the individual pneumatically operated adjusting units of the automobile seat are controlled through the individual tappets of the on/off valves that project into the particular paths of motion of the relative motions.

DESCRIPTION OF THE DRAWINGS

An example of embodiment of the invention will be described in detail below with reference to the drawings. The drawings show:

FIG. 1 is a perspective illustration of an operating mechanism pursuant to the invention, FIGS. 2-4 are cross sectional views taken along lines 2—2, 3—3 and 4—4 through an operating mechanism corresponding to FIG. 1.

DESCRIPTION OF THE INVENTION

The perspective illustration of the operating mechanism in FIG. 1 shows the fastening case 5, the handle housing 6, and the central block 7 located inside the housing.

The central block 7 is mounted to move and pivot on a shaft 8, which in turn is held in the fastening case 5 in its outer case wall. FIG. 2 and FIG. 4 shows this more precisely.

The central block 7 located on the shaft 8 is held in its central position (see FIG. 2) by the two cylinder springs 9 and 10 and can optionally be moved axially on the shaft as illustrated to the right or to the left against the pressure of one of the springs 9 and 10.

The central block is moved axially by means of the handle housing or single handle 6, which is the only operating part or handlepiece that the illustrated operating mechanism has.

The single handle 6 is connected to the central block 7 by the handle housing shaft 11. When the single handle is moved in its long direction, i.e., parallel to the central block shaft 8, then the central block, depending on its direction of motion, operates either the operating element 13 or the operating element 14 by means of its projecting part 12, each of which is mounted on the rear wall of the fastening case 5. The operating elements 13 and 14 in the illustrated example of embodiment control in logical correlation the adjusting unit of the automobile seat that causes the horizontal shifting of the seat horizontally toward the front or toward the rear.

When the single handle 6 in the illustration of FIG. 1 is moved upward or downward, perpendicular to its long dimension, then this pivots the central block 7 upward or downward around the central block shaft 8.

This pivoting motion is sensed by the two operating elements 15 and 16, which are likewise permanently mounted on the fastening case 5 the operating element 15 being located above the central block shaft 8 and the operating element 16 being located below the central block shaft 8 (see FIGS. 3 and 4). As illustrated in FIG. 3, there is a limit screw 17 with a compression spring 18 associated with each of these operating elements, which limits the pivoting motion of the central block 7 in one pivoting direction or the other and provides a central pivoting motion rest position of the central block 7 by means of the compression spring 18.

The aforementioned operating elements 15 and 16 in the illustrated example of embodiment in logical correlation control the adjusting unit of the automobile seat that causes the height adjustment of the seat upward or downward.

The single-handle 6 can also be pivoted around its handle housing shaft 11. In the illustration of FIG. 1, it is then no longer flush with the fastening case 5, but slopes downward or upward relative to it by an angle. The operating elements 19 or 20, which are fastened to the central block 7 but extend into the handle housing 6, are then actuated, so that they are actuated by the handle housing when the single-handle is pivoted.

In logical correlation, the operating elements 19 and 20 in the illustrated example of embodiment control the adjusting unit of an automobile seat that causes the tilting of the seat surface.

In the illustrated example of embodiment, two outer edges 21 and 22 of the central block 7 extend into the handle housing of the single handle 6, so that the latter cannot be excessively rotated when the seat surface is tilted, i.e., when the single handle 6 is pivoted around its handle housing shaft 11. A leaf spring or the like (not shown) can be provided to center the single handle 6 on its handle housing shaft 11.

In the operating mechanism described above, each of the operating elements 13, 14, 15, 16, 19, 20 is designed as an electrical operating switch for electrically actuated adjusting units of the automobile seat, but pneumatic operating valves can also be provided in the same way for pneumatically operated seat adjusting units.

We claim:

1. An actuating device for controlling the operation of a vehicle seat, said seat having first, second, third, fourth, fifth, and sixth adjustment functions, said actuating device comprising a fastening case, a central block shaft having an axis and mounted in said fastening case, a central block mounted on said central block shaft, said central block being movable in opposite first and second directions along the axis of said central block shaft and being pivotable in opposite third and fourth directions about the axis of said central block shaft, a handle housing shaft having an axis and mounted on said central block in perpendicular relation to said central block shaft, a handle housing mounted on said handle housing shaft, said handle housing being rotatable in opposite fifth and sixth directions with respect to the axis of said handle housing shaft, switch means actuated in response to movement of said central block in either of said first, second, third, or fourth, directions for controlling said first, second, third, or fourth, adjustment functions, respectively, and switch means actuated in response to movement of said handle housing in either of said fifth or sixth directions for controlling said fifth or sixth adjustment functions, respectively.

* * * * *